Patented Sept. 28, 1954

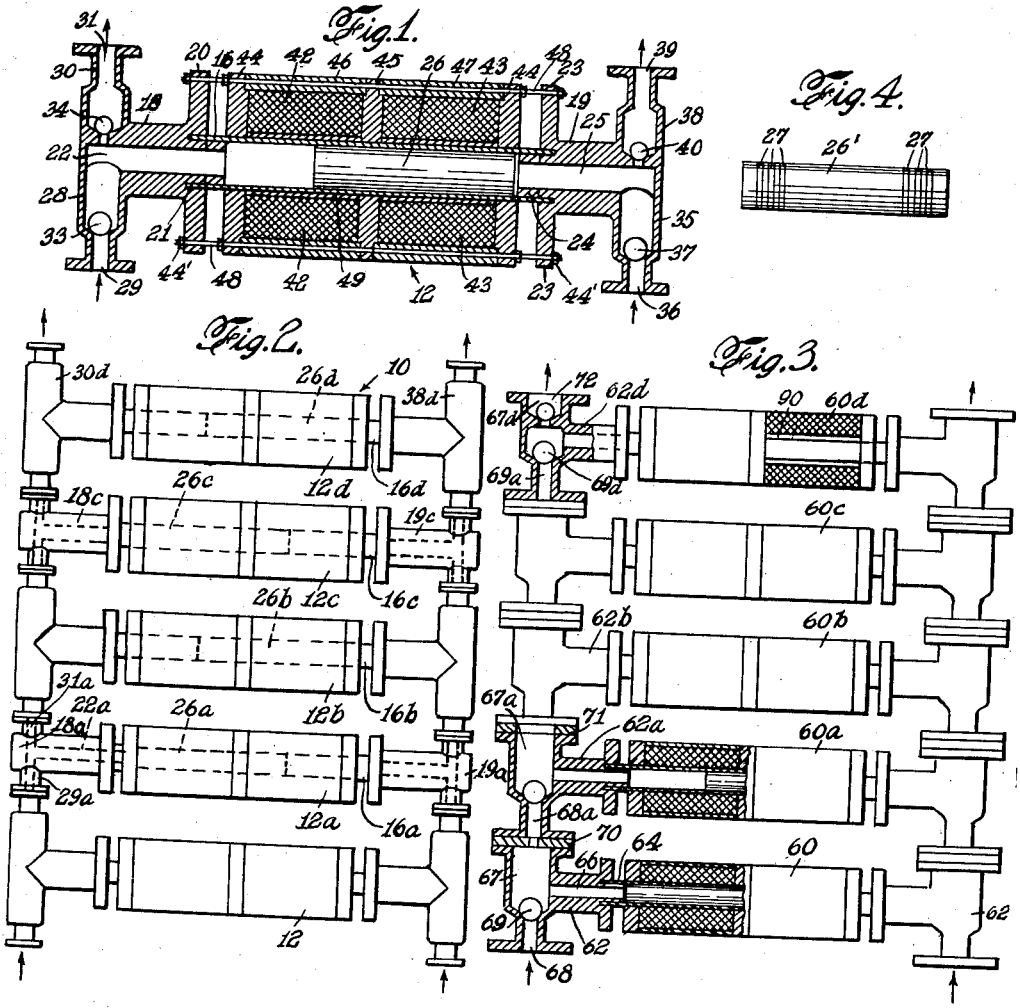

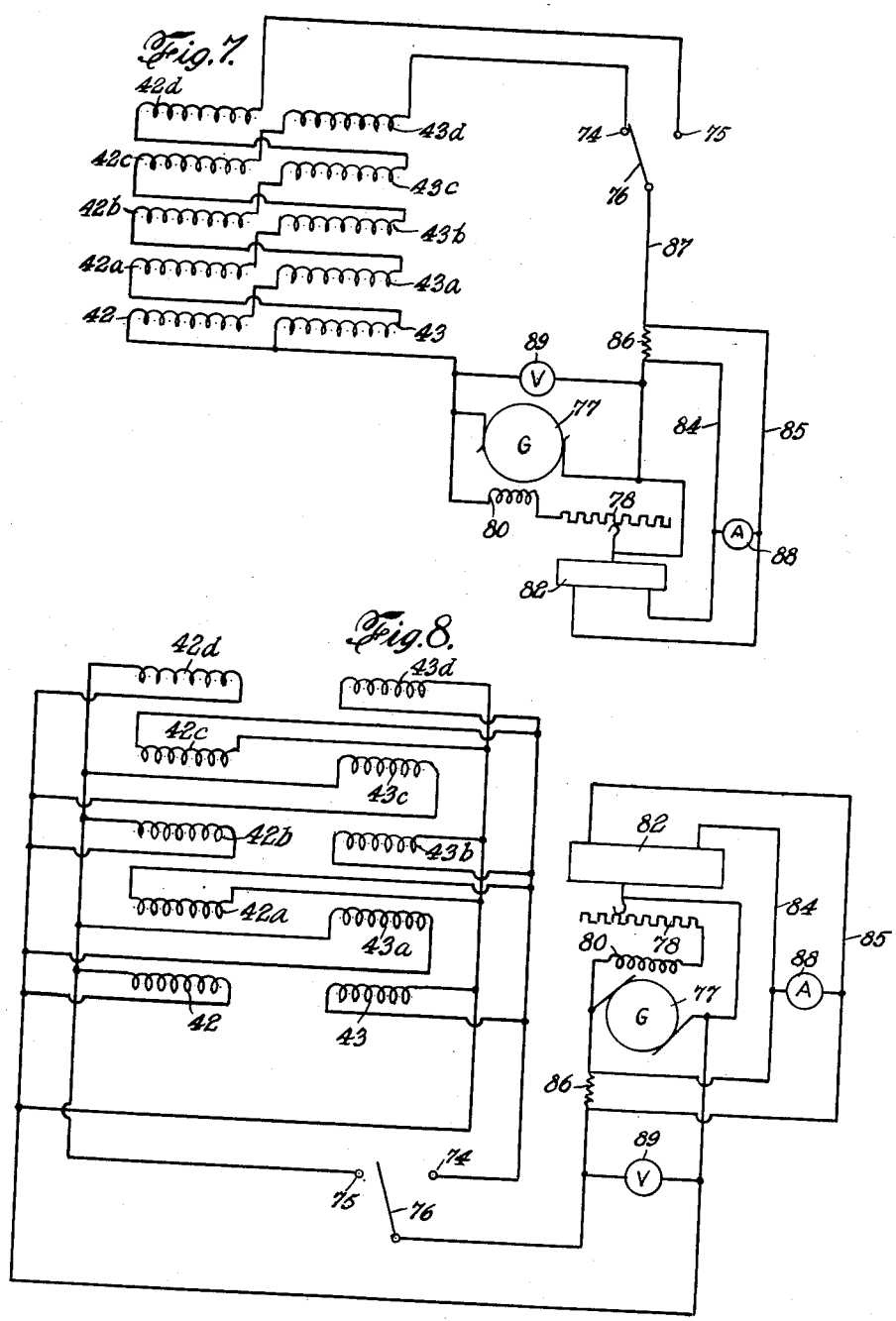

2,690,128

UNITED STATES PATENT OFFICE 2,690,128

ELECTROMAGNETIC PUMPING DEVICE

Alexis Basilewsky, Sea Cliff, N. Y., assignor to North American Solvay, Inc., New York, N. Y., a corporation of Delaware Application March 24, 1950, Serial No. 151,663

12 Claims. (Cl. 103—53)

This invention relates to a pumping device and is more particularly concerned with a device for pumping corrosive and toxic liquids.

The handling and transfer on an industrial scale of corrosive liquids, particularly liquefied gases, such as chlorine, presents a serious practical problem. The liquids attack the packing and other susceptible portions of the usual type of pump with the result that leaks occur and maintenance and replacement costs are exceptionally high. Furthermore, even a slight leakage of toxic liquefied gases, such as chlorine and phosgene, presents a health problem of major importance. The use of diaphragm pumps has been proposed in an attempt to avoid the inherent inadequacies of ordinary piston pumps, but diaphragm pumps have not satisfactorily solved the problem owing to the susceptibility of the diaphragms themselves to attack and distintegration by the liquids handled. Still another approach to the problem has involved the use of compressed gases for transferring the corrosive and toxic liquids. In systems involving such use of compressed gases, the liquids to be transferred, e. g. liquid chlorine, is allowed to flow by gravity into a closed vessel. When the vessel is full, or at least substantially full, compressed gas is introduced to provide the pressure necessary to force the liquid through suitable pipes or conduits into the vessels or containers where the liquid is to be stored or into the reaction vessels in which the liquid is to be employed, e. g. as a chlorinating agent. When the pressure vessel has been emptied as much as possible, or at least to the desired extent, the compressed gas in the vessel is led into an absorbing system in order that the chlorine or other gas which becomes admixed with the compressed gas may be removed. This operation, of course, requires a separate absorption installation and means must be provided for handling the absorbing material and disposing of the absorbed gas. The use of compressed gas in this type of pumping system necessarily involves non-continuous operation. Further, a suitable gas compressing system is required and the gas which is used must be carefully dried. While compressed air is the most obvious gas for use in this type of system, it is not generally satisfactory for use in pumping liquified chlorine. The increasing use of liquefied chlorine in chemical syntheses makes it undesirable to employ a compressed gas which contaminates the chlorine with oxygen, since oxygen has in many cases been found to adversely influence the reactions involving the liquefied chlorine. Consequently, in carrying out the aforementioned compressed gas transferring system it has been found necessary to employ an inert gas such as nitrogen. Oxygen-free nitrogen is, however, relatively expensive and of limited availability.

The use of gaseous chlorine has also been proposed in connection with the pressure transfer of liquefied chlorine, but it has been found in practice that the conditions of temperature and pressure which prevail in the pressure vessel are such that the chlorine tends to liquefy and the effective pressure of the gas is consequently lost. Furthermore, the use of chlorine gas makes necessary the provision of compressors adapted to handle this gas. Such compressors are, however, relatively expensive and are subject to the same shortcomings as are the pumps proposed for pumping liquefied chlorine.

It is an object of the present invention to provide an improved pumping device particularly adapted for transferring corrosive and toxic liquids.

It is a further object of the invention to provide a device of the character indicated which will satisfactorily handle liquefied gases.

It is a still further object of the invention to provide a device for continuously pumping liquid chlorine under pressure.

Another object of the invention is to provide an electrically actuated pumping device not requiring the use of packings or the like.

Another object of the invention is to provide an electrical system for operating a plurality of pumping elements in synchronism.

According to the invention, there is provided a pumping device comprising a plurality of electromagnetically-driven pumping units which are arranged to be operated as an integral pumping system. The piston or pumping element of each unit is actuated by an electrical current passing through a pair of solenoids. The piston forms the core of the solenoids and is caused to reciprocate by alternate energization of each solenoid. The pumping units are inter-connected and are adapted to be synchronously actuated to provide a device for continuously pumping a liquid, particularly a liquefied gas, at any predetermined pressure and at any predetermined rate.

It is a feature of the invention that the need for packings and other leakage-susceptible components of conventional pumping and compressing devices is eliminated, the entire moving mechanism of the device of the invention being contained within sealed housings.

Another feature of the invention is the provision of means for operating the electromagnetic pumping units in synchronism and under the influence of a constant current.

Other objects and features of the invention will be apparent from the following detailed description and from the drawings, in which:

Fig. 1 is a vertical sectional view of a pumping unit which is used in forming one illustrative embodiment of the pumping device of the invention;

Fig. 2 is a view in elevation of one embodiment of the pumping device;

Fig. 3 is a view, partly in section and partly in elevation of another embodiment of the invention;

Fig. 4 is a view in elevation showing details of one form of the piston employed in the pumping device.

Fig. 5 is a diagram showing the voltage changes during a single pumping cycle;

Fig. 6 is a similar diagram showing the constancy of the current during the pumping cycle;

Fig. 7 is a wiring diagram showing an electrical system for operating the device of the invention, in which the solenoids are arranged in series; and, Fig. 8 is a wiring diagram showing a corresponding parallel arrangement of the solenoids.

Referring to the drawings, the reference numeral 10 designates generally a pumping device embodying features of the present invention. The device 10 in the form illustrated in Fig. 2 is composed of five pumping units 12, 12a, 12b, 12c and 12d, interconnected to form an integrated pump. The construction of device 10 will be best understood from a description of one of the pumping units, e. g., unit 12. Referring particularly to Fig. 1, pumping unit 12 comprises a tube 16 extending between two flanged end members 18 and 19 to define a cylindrical chamber. The end member 18, provided with a flange 20, is formed with a projection or boss 21 which is concentric with flange 20 and provides an extension of a channel 22 extending horizontally through the end member 18. End member 19 is similarly formed with a flange 23, a projection 24 and a horizontal channel 25. The ends of the tube 16 are telescopically fitted over the projections 21 and 24 and inserted in circular recesses in the flanges 20 and 23 to provide a fluid-tight joint.

A cylindrical piston 26 is positioned in tube 16 and is free to reciprocate in tube 16 between projections 21 and 24. Movement of liquid through unit 12 is effected by the reciprocating movement of the piston 26 in tube 16 under the influence of an electrical current as will be described hereinafter. The tube 16 is made of a non-magnetic metal or alloy, such as bronze, monel metal, or the like and the piston 26 is made of a magnetic metal or alloy, such as mild steel. The piston 26 is conveniently designed to reciprocate in tube 16 with minimum clearance with the inside wall of the tube. If desired, the body of piston may have a substantially lesser diameter than the inside diameter of tube 16 and may be provided with graphite rings to obtain the necessary contact with the wall of tube 16. This modification is shown in Fig. 4 which illustrates a piston 26' having associated with it graphite rings 27.

The liquid being pumped is admitted to and discharged from pumping unit 12 through suitable valved openings in the end members 18 and 19. Referring to Fig. 1, the end member 18 has a downwardly extending inlet member 28 defining an inlet channel 29, and an upwardly extending outlet member 30 defining an outlet channel 31. Inlet and outlet channels 29 and 31 are provided with ball check valves 33 and 34 respectively, and communicate directly with horizontal channel 22. It will be observed that the portion of inlet channel 29 below the check valve 33 is of substantially greater diameter than the corresponding portion of outlet channel 31. This arrangement is of particular importance in the pumping of liquefied gases, such as chlorine, which are handled at temperatures and pressures close to the vaporization point. Undue resistance to the influx of the liquid during the suction stroke of the piston tends to cause partial vaporization and formation of a vapor lock. For this reason, the inlet channel is arranged to offer substantially less resistance to the flow of liquid than the outlet channel. End member 19 is identical in structure to member 18, having an inlet member 35, an inlet channel 36, an inlet check valve 37, an outlet member 38, and outlet channel 39 and an outlet check valve 40.

The movement of the piston 26 to and fro within tube 16 and the resultant pumping of the liquid is effected by means of an electrical current passing alternately through a pair of solenoids. As shown in Fig. 1, two solenoids 42 and 43 are mounted on tube 16 and are positioned between two circular end plates 44 which extend over tube 16. The solenoids are separated by a center dividing plate 45, which with end plates 44 form pole pieces for the solenoids 42 and 43. Casing walls 46 and 47 surround solenoids 42 and 43, respectively, and provide flux paths. The solenoids are held in position by the rods 48 extending between flanges 20 and 23. The rigidity of the assembly may be adjusted by means of nuts 44'. The plates 44 and 45 and casing walls 46 and 47 are formed from a magnetic material such as mild steel and provide a casing or carcass for the solenoids. A sheet of heat insulating material 49 separates the solenoids from the surface of tube 16. Heat generated in the solenoids is dissipated through casing walls 46 and 47 which are cooled by the surrounding air.

The pumping units 12b and 12d included in pumping device 10 have a body structure substantially identical with that of unit 12 described above, including pistons 26b and 26d, respectively, and solenoids 42b, 43b, and 42d, 43d, respectively. Pumping units 12a and 12c are similar in structure to unit 12, having pistons 26a and 26c and solenoid pairs 42a, 43a and 42c, 43c, respectively, but differ in the construction of the end members. Whereas the end members 18 and 19 of pumping unit 12 are provided with inlet and outlet valves for the unit, the end members 18a, 19a and 18c, 19c of pumping units 12a and 12c, respectively, are formed without valves. The end member 18a contains simply a horizontal channel 22a, communicating with the interior of a tube 16a, vertical inlet channel 29a and a similar vertical outlet channel 31a. End members 19a, 18c and 19c are similarly formed. By reason of the construction shown in Fig. 2, the valves in the inlet and outlet channels of units 12, 12b, and 12d control the flow of liquids not only through these units, but through units 12a and 12c, as well.

While the outlet channel 31 of unit 12 is formed with a restricted portion to prevent vapor lock, as previously mentioned, it is not necessary for the outlets in units 12b and 12d to have similar restricted portions.

In another embodiment, each end of each pumping unit may be provided with a single valve. Referring to Fig. 3, there is shown a pumping device according to the invention formed from an integrated set of five pumping units 60, 60a, 60b, 60c and 60d. The body portion of each unit is of the same construction as unit 12, but the end members are of modified structure. Pumping unit 60 is formed with end members 62 which provide an inlet and outlet means for the piston-retaining tube 64, which corresponds with tube 16 of unit 12. End members 62 are formed with a horizontal channel 66 communicating with tube 64, a vertical outlet channel 67 extending upwardly from channel 66, and a downwardly extending inlet 68. Inlet 68 is provided with a ball check valve 69 to control the flow of liquid into the tube 64. Pumping unit 60a is similarly formed with end members 62a having a downwardly extending inlet 68a. The restriction of the outlet channel 67 of unit 60 to prevent vapor lock is conveniently effected by means of an orifice plate 70 positioned between the ends of outlet channel 67 and inlet channel 68a. An orifice plate is similarly positioned between outlet 67a of end member 62a and the inlet end of end member 62b of unit 60b. The plate 71, however, does not restrict the flow of liquid from unit 60a to 60b. In order to provide a positive discharge from pumping unit 60d which is the last unit in the series, suitable valves are placed in the outlet channels of this unit. The end members 62d of unit 60d are formed with an outlet channel 67d designed to seat a ball check valve 72. As in the case of unit 60, the inlet channel 68d is provided with a ball check valve 69d.

It is a feature of the invention that the various pumping units which make up my improved pump may be operated in synchronism to effect a continuous, uniform pumping action. The synchronism is obtained by controlled electrical excitation of the solenoids. In Figs. 7 and 8 are shown two electrical systems which I have found suitable for operating the pistons of my pump. Referring particularly to Fig. 7, the solenoids in each of the five pumping units making up the pumping device 10 are shown connected in two series circuits. It will be observed that solenoids 42, 43a, 42b, 43c and 42d are connected in one circuit and solenoids 43, 42a, 43b, 42c and 43d are connected in the other circuit. Each of the two solenoid circuits may be alternately connected at terminals 74 and 75 by an adjustable automatic timing switch, e. g., a commutator 76, to the power source, e. g., the direct current generator 77. Instead of a commutator the adjustable automatic timing switch may be an electronic device, a pendulum, a thermostatic device, or the like. Similarly, while a generator is particularly desirable as a power source, other sources of electrical power may be used.

In accordance with the invention, I provide a power circuit for the solenoids which will deliver a constant current to energize the solenoids and drive the pistons 26, 26a, 26b, 26c and 26d in the tubes 16, 16a, 16b, 16c, and 16d, respectively. For this purpose, a variable resistance device, such as a rheostat 78 is electrically connected in the field 80 of generator 77. The rheostat 78 is electrically connected to a voltage regulating device 82 of known construction. The device 88 may bet set at any desired predetermined value and will automatically maintain the current at that value by actuating the rheostat 78 and causing appropriate changes in the voltage of the generator 77. The electrical connections between the voltage regulator 82 and the solenoid circuits are shown at 84 and 85 extending from the ends of a fixed resistance 86 in the line 87 between the timing switch 76 and the generator 77. An ammeter 88 is shown between 74 and 85 and a voltmeter 89 is placed in parallel with the generator 77 in the solenoid circuits.

The provision of means for maintaining a predetermined constant current is especially important in the pumping of liquefied gases. A uniform constant current insures a continuous flow of liquid, at the pressure at which it is desired to deliver the liquid. The combined force of the several pistons of the device acting in unison under the influence of the constant current makes possible a smooth, effective pumping action not heretofore obtainable. The necessary pumping pressure, which in the case of certain liquefied gases may be 15 atmospheres per square inch or even more, is built up in a series of stages. Each piston supplies a proportion of the total force required. The force delivered by each piston is, of course, proportional to the ampere turns, and with a constant current, a constant force can be applied. It is thus possible in accordance with my invention to provide a practical device employing the principles of electromagnetism for pressure pumping of liquefied gases. The constant current prevents the building up of an excessive pressure on the one hand, or a drop in pressure, on the other. If, for example, the pressure should tend to exceed the value at which the pump is set to operate, e. g., by the selection of a given current, the pistons will not move since the current can't move the pistons against a pressure greater than the force exerted by the predetermined current. Thus there is no need for by-passes or pressure relief devices. This is an advantage not obtainable from conventional mechanical pumps and is one of the features which make my device eminently suitable for liquefied gases. The pressure delivered by the pump is readily controlled by suitable adjustment of the voltage regulator 82 and the speed of the pump, i. e., the volume delivered per unit of time may be adjusted to any desired value by means of the adjustable timing switch which controls the period of reciprocation of the pistons. The adjustable current regulator and the adjustable timing switch thus permit the pump to be operated and deliver liquid at a predetermined rate at a predetermined pressure.

It will also be observed that my pump requires no packings, seals or other devices for preventing leakage around a reciprocating piston, and no mechanical connection with the outside is necessary. The entire mechanism is contained in a sealed housing. While in the drawings the device is shown as formed from a plurality of separable units, and this type of construction is desirable from a practical standpoint to facilitate the making of repairs, inspection and the like, the entire structure could, from the standpoint of operation, be formed from integral units. Furthermore, it will be observed that the device 10 is free of mechanical connections which require lubrications or tend to become loose and interfere with the smooth operation of the pump. The pistons are freely reciprocable in the cylinders and devoid of any mechanical attachment with any other part of the device. The valves are of the simple ball and seat construction operable solely by the pressure of the liquid on each side of the valve.

When my pumping device is to be used it is, of course, suitably connected in the line in which the liquid is to be carried. The inlet members 28 and 35 may each be connected to separate sources of liquid or they may be connected to a common source by appropriate piping. The outlet members 30d and 38d are similarly connected to the outlet piping. To place the pump 10 in operation, current is caused to flow through one of the solenoid circuits, for example the circuit containing the solenoids 42, 43a, 42b, 43c and 42d. This is accomplished by making the contact between switching device 76 and terminal 75. The flow of current through the solenoids will by reason of electromagnetic force, move piston 26 to the left and liquid will be drawn in through the inlet channel 36. The automatic switching device 76, which may be set to operate at any given interval will then break the circuit and by subsequent contact with terminal 74 cause the current to flow through solenoids 43, 42a, 43b, 42c and 43d. The current passing through this set of solenoids will cause the piston 26 to move toward the right in tube 16. During this stroke, liquid is drawn in through the inlet channel 29, and discharged from unit 12 through outlet channel 39. The timing device 76 then makes contact with terminal 75 and the cycle is repeated. As a result of the electrical connections between the solenoids in the several units, it will be seen that when piston 26 in pumping unit 12 is actuated, the pistons in the pumping units 12a, 12b, 12c and 12d will be simultaneously actuated. As will be apparent from the wiring diagrams in Figs. 7 and 8, when the piston 26 in unit 12 is moved to the right, the piston 26a in unit 12a will be simultaneously moved to the left, the piston 26b in unit 12b will be moved to the right, and so on. Thus, all pistons will be actuated in synchronism to propel liquid through the device 10. As a result, a coordinated pumping effect will be realized. The liquid will finally be discharged through the outlets 31d and 39d of unit 12d into suitable pipes or conduits.

The behavior of the current during the operation of the pump and the results of the mutual cooperation of the devices forming the electrical power circuit will be seen by reference to Fig. 5 and Fig. 6.

At moment 0 when the switching device makes contact with, for example, terminal 74, the solenoids 43, 42a, 43b, 42c and 43d will be energized. When the switching device 76 makes the contact the voltage of the generator 77 will have been at its maximum value and the current at 0. As the contact is made the current will rise. It will, however, not rise immediately to its regulated value, but, owing to the inductance of the circuit, will require a moment to attain the value necessary to move the pistons. This interval is designated a. As the current tends to exceed the designated value the voltage regular 82 will be actuated and by automatic adjustment of the rheostat 78 the voltage of the generator will drop. This will cause a drop in the current, and, as the pistons begin to move, there will be an electromagnetic force induced in the solenoids which will oppose the voltage in the generator. These current adjustments occur during the interval a–b. The pistons will then be moving at their normal speed and the current and voltage will remain constant. At moment c the pistons will reach the end of their stroke and will stop and the current will have a tendency to increase. The voltage regulator 82, however, will reduce the voltage of the generator and maintain the current constant during the interval c–d, d being the moment at which the timing device 76 disconnects the circuit by moving away from terminal 74. At moment d the total current of the generator 77 will drop to 0 and the voltage regulator 82 will increase the voltage of the generator 77 to its maximum value. At moment e the switch 76 will make contact with terminal 75 and solenoids 42, 43a, 42b, 43a and 42d will be energized and at moment f the pistons will begin to move in the opposite direction, and will move through the interval f–g and g–h. At moment i the contact between the switch 76 and terminal 75 will be broken and the cycle will repeat itself.

Since there will be a tendency for some sparking to occur at the terminals 74 and 75, it will be apparent that resistance and inductance devices may be inserted between terminals 74 and 75 to provide the necessary reactance to avoid any excessive sparking.

As previously mentioned the heat produced in the solenoids is dissipated through the casing walls which are cooled by the surrounding walls and, indeed, one of the advantages of my multiple pump construction is such provision for air cooling of the solenoids. In some cases, however, as when exceptionally large currents are used, it may be desirable to provide additional cooling means in order to guard against possible partial vaporization of the liquid being pumped. For this purpose, a jacket 90, as shown in Fig. 3, may be provided around the cylinder-forming tubes between the tube and the solenoids. The jacket is provided with a convenient inlet and an outlet (not shown) in order that a coolant may be circulated through the jacket to prevent the cylinder from over-heating.

While I have described my pumping device with particular reference to the pumping of liquefied gases, such as liquefied chlorine, it is equally satisfactory for use in pumping other materials which are liquid at normal or somewhat elevated temperatures, for example, mercury and liquid sodium. When my pumping device is to be used for pumping materials such as sodium which are solid at normal temperatures, it is desirable to provide some convenient heating means in order to insure that the material being handled will be in the liquid state when the pump is in operation. The above-described jacket 90 can be conveniently used for heating the cylinder of the pump, i. e. by circulating steam or other heat transfer agent, e. g. Dowtherm (an eutetic mixture of diphenyl and diphenyl oxide) through the jacket. The end members 18 and 19 may be provided with electric strip heaters, for example, or may be jacketed in any convenient manner or may be otherwise provided with heating means.

It will also be obvious that various other changes may be made, particularly in the arrangement of the electrical circuits, without departing from the scope of the invention as defined in the appended claims, and it is intended, therefore, that all matter contained in the foregoing description and in the drawings shall be interpreted as illustrative and not in a limiting sense.

What I claim and desire to secure by Letters Patent is:

1. An electromagnetic pumping device which comprises, in combination, a plurality of cylinders including a first cylinder, a last cylinder arranged in fluid communicating relationship with each other, pistons reciprocable in said cylinders, a pair of solenoids coaxially positioned about each of said cylinders, said fluid communicating relationship including fluid conducting means connecting opposite ends of each of said cylinders to opposite ends of at least one adjacent cylinder, fluid inlet means in each end of said first cylinder, fluid outlet means in each end of said last cylinder, valve means in said fluid conducting means, said valve means permitting flow only in the direction of said last cylinder, whereby movement of said pistons in said cylinders effects flow of fluid into the next cylinder in the direction of said last cylinder, and means for alternately energizing each solenoid in said solenoid pairs, said energizing means being adapted to energize simultaneously one solenoid of each pair to cause said pistons to reciprocate alternately in unison in opposite directions.

2. An electromagnetic pumping device which comprises, in combination, a plurality of cylinders including a first cylinder, a last cylinder arranged in fluid comunicating relationship with each other, pistons reciprocable in said cylinders, a pair of solenoids coaxially positioned about each of said cylinders, said fluid communicating relationship including, fluid conducting means connecting opposite ends of each of said cylinders to opposite ends of at least one adjacent cylinder, fluid inlet means in each end of said first cylinder, fluid outlet means in each end of said last cylinder, valve means in said fluid-conducting means, said valve means permitting flow only in the direction of said last cylinder, whereby movement of said pistons in said cylinders effects flow of fluid into the next cylinder in the direction of said last cylinder, and means for alternately energizing each solenoid in said solenoid pairs, said energizing means comprising an automatic switching device and being adapted to energize one solenoid of each pair to cause said pistons to reciprocate alternately in unison in opposite directions.

3. An electromagnetic pumping device which comprises, in combination, a first cylinder, a last cylinder, and at least one intermediate cylinder arranged in fluid communicating relationship, pistons reciprocable in said cylinders, a pair of solenoids coaxially positioned about each of said cylinders, said fluid communicating relationship including fluid conducting means connecting opposite ends of said first cylinder with opposite ends of an adjacent intermediate cylinder, means connecting opposite ends of said last cylinder to opposite ends of an adjacent intermediate cylinder, fluid inlet means in each end of said first cylinder, fluid outlet means in each end of said last cylinder, valve means in said fluid-conducting means, said valve means permitting flow only in the direction of said last cylinder, whereby movement of said pistons in said cylinders effects flow of fluid into the next cylinder in the direction of said last cylinder, and means for alternately energizing each solenoid in said solenoid pairs, said energizing means being adapted to energize simultaneously one solenoid of each pair to cause said pistons to reciprocate alternately in unison in opposite directions.

4. An electromagnetic pumping device which comprises, in combination, a first cylinder, a last cylinder, and at least one intermediate cylinder arranged in fluid communicating relationship, a piston reciprocable in each of said cylinders, inlet means at each end of said first cylinder, outlet means at each end of said last cylinder, a pair of solenoids coaxially positioned about each of said cylinders, said fluid communicating relationship including fluid conducting means connecting opposite ends of said first cylinder with opposite ends of an adjacent intermediate cylinder, fluid conducting means connecting opposite ends of said last cylinder with opposite ends of an adjacent intermediate cylinder, valve means in said fluid-conducting means, said valve means permitting flow only in the direction of said last cylinder, whereby movement of said pistons in said cylinders effects flow of fluid into the next cylinder in the direction of said last cylinder, and means for alternately energizing each solenoid in said solenoid pairs, said energizing means being adapted to energize simultaneously one solenoid of each pair to cause said pistons to reciprocate alternately in unison in opposite directions.

5. An electromagnetic pumping device which comprises, in combination, a first cylinder, a second cylinder, and at least one intermediate cylinder arranged in fluid conducting relationship, a piston reciprocable in each of said cylinders, a pair of solenoids coaxially positioned about each of said cylinders, fluid inlet and fluid outlet means for each end of each of said cylinders, said fluid communicating relationship including fluid conducting means connecting the inlet means of said second cylinder with the outlet means of an adjacent intermediate cylinder and the outlet means of said first cylinder with the inlet means of an adjacent intermediate cylinder, whereby opposite ends of each of said cylinders are in said fluid communicating relationship with the opposite ends of the other cylinders, said outlet means of said first cylinder being of greater diameter than said inlet means, and means for alternately energizing each solenoid in said solenoid pairs, said energizing means being adapted to energize simultaneously one solenoid of each pair to cause said pistons to reciprocate alternately in unison in opposite directions.

6. An electromagnetic pumping device which comprises, in combination, a plurality of cylinders in fluid communicating relationship and forming an integrated unit, a piston reciprocable in each of said cylinders, a first solenoid and a second solenoid coaxially positioned about each cylinder, the first solenoid being adapted to move said piston in one direction and the second solenoid being adapted to move said piston in the opposite direction, and means for energizing said solenoids, said energizing means comprising a circuit arranged to energize simultaneously the first solenoids of every other cylinder in said integrated series and the second solenoids of the intermediate cylinders, and a circuit arranged to energize simultaneously the second solenoids of every other cylinder and the first solenoids of said intermediate cylinders, whereby the pistons in said cylinders are caused to reciprocate alternately in unison in opposite directions.

7. A device as defined in claim 6, further comprising means for maintaining the current in said circuits substantially constant during each stroke of said pistons, said means comprising variable resistance means connected to said energizing circuit and responsive to changes in the current in said circuit, whereby changes in the current in said circuit effect changes in said variable resistance means, said variable resistance means being connected to vary the current output of the power source feeding said circuit.

8. A device as defined in claim 6, wherein said energizing means comprises a generator adapted to be alternately connected in said circuits, said generator being connected in a third circuit comprising a variable resistance, and means for automatically varying said resistance in response to voltage changes in said first circuits.

9. A pumping device which comprises, in combination, a plurality of electromagnetic pumping units arranged to form an interconnected fluid communicating series, each unit comprising a cylinder, a reciprocable piston in said cylinder, and a pair of solenoids coaxially positioned about said cylinder, fluid conducting means connecting opposite ends of said cylinders, each end of said cylinder having an inlet and an outlet, valve means in said fluid conducting means for providing unidirectional flow from each of said units to another of said units, whereby fluid introduced at one end of said device is transferred to the other end of said device, and means for imparting synchronous reciprocation to said pistons, said last-named means being arranged to actuate the pistons in alternate units simultaneously alternately in opposite directions whereby to provide a continuous flow of liquid through said device during each movement of said pistons.

10. A device as defined in claim 9, wherein said means for imparting synchronous reciprocation to said pistons comprises a source of electrical power, two circuits arranged to be alternately connected with said power source, each of said circuits containing one of the solenoids of each of said pair of solenoids in said units.

11. In an electromagnetic pumping device, a plurality of cylinders, a plurality of pairs of axially-aligned solenoids, with a pair of said solenoids positioned about each of said cylinders, the members of each pair of solenoids being arranged for alternate energization, the members of all the pairs of solenoids being connected to form two circuits of simultaneously energizable solenoids, a piston axially reciprocable within each of said cylinders, a source of current, and switching means for alternately connecting said power source with each of said circuits of solenoids to effect reciprocation of said pistons in said solenoid pairs, said current being constant during each stroke of said piston.

12. In an electromagnetic pumping device, a plurality of cylinders, a plurality of pairs of axially-aligned solenoids, with a pair of said solenoids positioned about each of said cylinders, the members of each pair of solenoids being arranged for alternate energization and the members of all the pairs of solenoids being connected to form two circuits of simultaneously energizable solenoids, a piston axially reciprocable within each of said cylinders, a generator, switching means for alternately connecting each circuit to said generator and means for controlling the voltage of said generator whereby to maintain the current flowing through said solenoid circuits substantially constant during each stroke of said pistons in said solenoid pairs.

References Cited in the file of this patent

UNITED STATES PATENTS

| Number | Name | Date |
|---|---|---|
| 495,344 | Jandin | Apr. 11, 1893 |
| 773,120 | Christmas | Oct. 25, 1904 |
| 803,936 | Stokes | Nov. 7, 1905 |
| 1,647,147 | Roller | Nov. 1, 1927 |
| 2,283,886 | Henkell | May 19, 1942 |